United States Patent Office 3,381,054
Patented Apr. 30, 1968

3,381,054
THERMOSETTING MIXTURE OF A MELAMINE-FORMALDEHYDE CONDENSATE AND AN INTERPOLYMER OF A STYRENE MONOMER AND A MALEIC MONOMER
John R. Le Blanc, Wilbraham, Frank S. O'Connell, Holyoke, and Stuart H. Rider, Longmeadow, Mass., assignors to Monsanto Company, a corporation of Delaware
No Drawing. Filed Jan. 2, 1964, Ser. No. 335,404
8 Claims. (Cl. 260—839)

The present invention is directed to a thermosetting resin composition having excellent thermal flexibility and thermal stability and more particularly to a resin system having in admixture a thermosetting reaction product and an interpolymer which materials react when heated.

Generally, thermosetting resins are notoriously well known in the art for use in many industrial applications. They are known to be very rigid and when subjected to high temperatures, i.e., in the range of 200–300° C. they still have and retain their rigidity. In fact, the thermosetting resins of the melamine-formaldehyde type either alone or in admixture with a phenol-formaldehyde resin geenrally retain their rigidity up to the time they are completely consumed by exposure to higher temperatures such as 500° C. and greater. In addition, it has been observed that such resins apparently undergo a weight transition or weight loss while being subjected to the higher temperatures of 200–300° C. This has a serious drawback when using the resins for applications where they will be exposed to temperatures of 260° C. and higher. Therefore, it would be advantageous to the industry to have a resin system having a minimum weight loss when subjected to higher temperatures and having a certain degree of flexibility at the higher temperatures. It has been discovered that by admixing a particular thermosetting resin and a particular interpolymer, the resin system when advanced to an infusible state has surprisingly good thermal stability and good thermal flexibility.

Therefore, it is an object of this invention to provide a thermosetting resin composition.

Another object of this invention is to provide a thermoset resin having excellent thermal stability and thermal flexibility.

Other objects of this invention will in part be obvious and will in part be set out and appear hereinafter.

Briefly, these and other objects of this invention are attained by a composition having in admixture 95–5 weight percent of a thermosetting resin system which is either (1) a melamine-formaldehyde condensate or derivatives of melamine-formaldehyde condensates or mixtures thereof with phenol-formaldehyde condensates and (2) 5–95 weight percent of a particular interpolymer which interpolymer is the polymerization reaction product of a styrene monomer and a maleic monomer. When the resin system is heated, the thermosetting resin system and the interpolymer react to form a thermoset resin composition having excellent thermal stability and thermal flexibility.

The following examples are set forth to illustrate more clearly the principles and practices of this invention to one skilled in the art and they are not intended to be restrictive but merely to be illustrative of the invention herein contained. Unless otherwise stated herein, all parts and percentages are on a weight basis.

Example I

To 75 parts of the resin solids of a methylated melamine-formaldehyde reaction product prepared by reacting 2.5 mols of formaldehyde per mol of melamine under alkaline conditions, add 25 parts of the solids of the ammonium salt of a styrene maleic anhydride interpolymer. The styrene maleic anhydride interpolymer employed herein is prepared by the mass polymerization of a 1 molar portion of a styrene monomer and a 1 molar portion of a maleic anhydride monomer employing a molecular weight regulator. The ammonium salt of the styrene maleic anhydride interpolymer is prepared by first forming a water dispersion of the styrene maleic anhydride interpolymer and then adding ammonium hydroxide until the styrene maleic anhydride interpolymer is completely dissolved. The resulting composition is prepared to contain 40 weight percent on the weight of total solids.

This resin is designated at I.

Example II

Example I is repeated except that 50 parts of the methylated melamine-formaldehyde resin are employed therein in place of the 75 parts and, correspondingly, 50 parts of the ammonium salt of the styrene maleic anhydride interpolymer are employed in place of 25 parts thereof.

This resin is designated as II.

Example III

Example I is repeated except that 25 parts of the methylated melamine-formaldehyde resin are employed therein in place of the 75 parts thereof and, correspondingly, 75 parts of the ammonium salt of the styrene maleic anhydride are employed herein in place of the 25 parts thereof.

This resin is designated as III.

Example IV

Example I is repeated except that the styrene maleic anhydride employed herein is one prepared by the mass polymerization reaction of 1 molar portion of styrene and 1 molar portion of maleic anhydride using terpinolene as a specific molecular weight regulator.

This resin is designated as IV.

Example V

Example I is repeated except that in place of the 75 parts of the methylated melamine-formaldehyde resin, 75 parts of a mixture of the methylated melamine-formaldehyde and phenol-formaldehyde reaction products are employed herein. The phenol-formaldehyde is prepared by the reaction of 2.0 mols of formaldehyde per mol of phenol under alkaline conditions and recovered in an aqueous medium.

This resin is designated as V.

Example VI

With each of the resins of Examples I–V, the thermal flexibility of the resin samples is determined by measuring the glass transition temperature thereof. As a control, the glass transition temperature of an unmodified methylated melamine-formaldehyde resin is also determined which resin is prepared by the condensation reaction of 2.5 mols of formaldehyde per mol of melamine under alkaline conditions. Cured samples of the resins are prepared by heating the resin samples in a closed mold at 170° C. for 15 minutes under a pressure of 400 p.s.i.g. The test specimens are then cut into strips of 1" x ½" each having a thickness of 0.3". The glass transition temperatures of the test specimens are determined by plotting the logarithmic shear modulus vs. temperature in ° C. and is described in Mechanical Properties of Polymers by Dr. L. Nielsen, published 1961, chapter 7, Dynamic Mechanical Testing. It is that point on the curve where the slope of the curve has the greatest change. The actual test is conducted employing a heating chamber and a torsion pendulum to which the specimen is attached. The glass transition temperatures are as follows:

TABLE I

| Resin compositions: | Glass transition temperatures, °C. |
|---|---|
| I | 210 |
| II | 200 |
| III | 185 |
| IV | 210 |
| V | 215 |
| Methylated melamine-formaldehyde | Infusible>260 |

In general the glass transition temperature is that temperature at which the resin sample begins to soften. Thus, this example clearly shows that the resin compositions of this invention have greater thermal flexibility, as dedetermined by their glass transition temperatures, than an unmodified melamine-formaldehyde resin which is infusible and had a glass transition temperature in excess of 260° C. The lower the glass transition temperature the better the flexibility of the resin when exposed to the higher temperatures.

Example VII

The thermal stability of each of the resin compositions of Examples I–V is also determined by preparing test specimens in the same manner as in Example VI. The control methylated melamine-formaldehyde resin as employed in Example VI is also employed herein to prepare a test specimen for purposes of comparison. The samples are weighed and are then exposed to a temperature of 260° C. for 300 hours. The samples are reweighed to determine their weight loss. The results are as follows:

TABLE II

| Resin composition: | Percent weight loss |
|---|---|
| I | 70 |
| II | 64 |
| III | 60 |
| IV | 70 |
| V | 65 |
| Methylated melamine-formaldehyde | >80 |

This example shows that the styrene maleic anhydride increases the thermal stability of the resin in comparison to an unmodified melamine-formaldehyde resin system. By thermal stability, it is meant the percent loss in weight of the resin when subjected to elevated temperatures.

The instant invention is directed to a thermosetting resin composition which when advanced to the infusible state has excellent thermal stability and excellent thermal flexibility. More specifically, the thermosetting resin composition of this invention comprises in admixture (A) 95–5 weight percent of a thermosetting reaction product selected from the group consisting of melamine-formaldehyde, derivatives of melamine-formaldehyde and mixtures thereof with phenol-formaldehyde and (B) correspondingly, 5–95 weight percent of a particular interpolymer. The interpolymer employed herein is the polymerization reaction product of a styrene monomer and a maleic monomer which maleic monomer may be either maleic anhydride, maleic acid or half esters of maleic acid and 1–18 carbon atom monohydric alcohols, or mixtures thereof. In the practice of this invention, the preferred range of materials is 75–35 weight percent and more specifically 60–40 weight percent of the thermoset reaction product and, correspondingly, 25–65 weight percent and more specifically 40–60 weight percent of the particular interpolymer. As shown in the examples, it has been surprisingly discovered that by employing increasing amounts of the interpolymer with the thermosetting resin, the composition has increasing thermal stability and increasing thermal flexibility when advanced to the infusible state. Therefore, as a practical matter the range of ingredients can vary from 95–5 weight percent of the thermosetting resin composition while the interpolymer can, correspondingly, vary from 5–95 weight percent thereof. The amounts of the particular ingredients so employed depends upon the desired thermal stability and/or thermal flexibility wanted.

The melamine-formaldehyde reaction products employed herein are the reaction products of 1.5–6.0 and preferably 2.0–4.0 mols of formaldehyde per mol of melamine generally under alkaline conditions in a pH range of 7–11 and preferably 8–10. The reaction is carried out at temperatures ranging from about 60° C. to reflux temperature at atmospheric pressure. The reaction is continued until the desired water-dilutability point is reacted which is determined by a cloud or precipitate formed in a predetermined quantity of water at 25° C.

The derivatives of melamine-formaldehyde resins employed herein are prepared by the reaction of 1.5–6.0 and preferably 2.0–4.0 mols of a substituted melamine per mol of formaldehyde or are alcohol modified melamine-formaldehyde resins. The substituted melamines can be either the alkyl or aryl melamines which may be mono- di-, tri- or tetra substituted. In the alkyl substituted melamines, each alkyl group can contain 1–6 and preferably 1–4 carbon atoms. Typical examples of some of the alkyl substituted melamines are monomethyl melamine, dimethyl melamine, trimethyl melamine, monoethyl melamine and 1-methyl-3-propyl-5-butyl melamine. In the aryl substituted melamines, each aryl group can contain 1–2 and preferably 1 phenyl radical. Typical examples of aryl substituted melamines are monophenyl and diphenyl melamines. The alcohol modified melamine-formaldehyde resins are prepared by first reacting melamine and formaldehyde in the proportions stated previously and then esterifying the product so obtained with an alcohol. Any alcohol can be used but generally alcohols containing 1–4 carbon atoms are preferred.

The melamine-formaldehyde and derivatives of melamine-formaldehyde reaction products of this invention may be employed in solution by dissolving 40–60 weight percent of the reaction product or resin in a corresponding 60–40 weight percent of a solvent consisting of either water or a mixture of a major amount of water and a minor amount an acylic alcohol. The acyclic alcohol may contain 1–4 carbon atoms and include such compounds as methanol, ethanol, ethylene glycol, glycerine, propylene glycol, etc. The precise quantity of acyclic alcohol required in the water-alcohol solvent media will depend upon the specific structure of the resin, but generally will be within the range of 0.5–4.0 weight percent and as a practical matter 0.5–20 weight percent and, preferably, less than 5 weight percent of the solvent media. It should be noted, however, that when employing esterified melamine-formaldehyde resins esterified with 2–4 carbon alcohols, an organic solvent is necessary in order to prepare solutions thereof.

The phenol-formaldehyde resin employed in the practice of this invention can be any phenol-formaldehyde reaction product. Preferably, it is the reaction product of 0.5–3.5 mols of formaldehyde per mol of phenol under alkaline or acidic conditions. When reacting less than 1 mol of formaldehyde per mol of phenol, a novolac resin is prepared which requires the further addition of a cross-linking agent such as hexamethylenetetraamine to cause the resin to advance to the infusible state when exposed to elevated temperatures. This is commonly known as a two-stage resin. When reacting one or more mols of formaldehyde per mol of phenol, the reaction product is known as a one-stage resin and does not require additions of a cross-linking agent. The resin may be recovered in either a water system, a water-organic solvent system or a straight organic solvent system. The preferred phenol-formaldehyde resin to be employed in the practice of this invention is a phenol-formaldehyde resin prepared by reacting 1.0–3.5 mols of formaldehyde per mol of phenol under alkaline conditions and wherein the resin is recovered in a water system.

When employing the mixtures of the resins of this invention, the mixtures will consist of 80–20 weight percent of the melamine-formaldehyde resin and correspondingly 20–80 weight percent of the phenol formaldehyde resin. Preferably the mixture should consist of 60–40 weight percent and correspondingly 40–60 weight percent, respectively. The melamine-formaldehyde resin may also be a mixture thereof with derivatives of melamine-formaldehyde resins.

As stated previously the interpolymer employed in the instant invention is the polymerization product of a maleic monomer and a styrene monomer. Generally, the monomers are reacted or interpolymerized by the mass polymerization process and at a temperature of at least 100° C. In the process of preparing the interpolymer employed herein, a free radical generating polymerization initiator and molecular weight regulator are generally employed. Preferentially, the reaction process is carried out at a reaction rate not greater than 5 times the rate at which the added styrene monomer is being polymerized. That is, the maleic monomer is first charged to the reaction kettle and the styrene monomer is added thereto at the rate specified previously. In another method, the styrene monomer can be added to the reaction kettle at a rate substantially equal to the rate at which the added styrene monomer is being polymerized. The free radical generating regulator initiator is generally present in the polymerization reaction in the amount of at least about 0.5% and preferably 0.5–10% and more specifically 1.0–4.0 weight percent based upon the weight of the styrene monomer that is being added to the system. Typical examples of the free radical generating polymerization initiators which may be employed include benzoyl peroxide, ditertiary butyl peroxide, tertiary butyl hydroperoxide, lauroyl peroxide, tertiary butyl perbenzoate, tertiary butyl peracetate, azoisobutyronitrile, cumene hydroperoxide, etc.

The reaction is also carried out in the presence of a specific type of molecular rate regulator which is present in the reaction mixture in the amount of at least about 0.5% and preferably in the amount of at least about 0.5–30% and more especially 5–20%, based upon the weight of the styrene monomer that has been added to the maleic monomer.

The free radical generating polymerization initiator and the molecular weight regulator may be initially charged to the reaction with the maleic monomer, may be added to the polymerization with the styrene monomer or may be split therebetween. Preferably, a substantial portion and optionally all of the molecular weight regulator required in the reaction is charged with the maleic monomer and the free radical generating polymerization initiator is charged to the polymerization reaction with the styrene monomer.

The molecular weight regulators employed in the process of the invention conform to the formula:

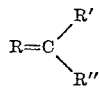

wherein R is a cyclic organic radical to which =CR′R″ is joined at a carbon atom of an alicyclic ring having at least 4 members, and wherein R′ and R″ are independently selected from the group consisting of hydrogen and an alkyl radical.

Exemplary of utilizable molecular weight regulators are methylene cyclobutane, methylene cyclopentane, caryophyllene, pulegone, terpinolene, beta-terpinene, pseudolimonene, beta-phellandrene, 1(7), 4(8)-p-menthadiene, 2,4(8)-p-menthadiene, sabinene, beta-pinene, camphene, alpha-fenchene, beta-fenchene, and mixtures thereof, as well as many other compounds which satisfy the requirement of corresponding to the above formula, especially the compounds wherein R′ and R″ of the formula represent hydrogen or a methyl group.

The preferred molecular weight regulators are cyclic terpenes which contain a 6-membered alicyclic ring, monocyclic terpenes being especially preferred. Although such cyclic terpenes can advantageously be employed in the form of commercial terpene mixtures, it is usually preferred to avoid using commercial terpene mixtures wherein the molecular weight regulator of the invention is contaminated by any substantial amount of impurities other than unsaturated cyclic terpenes. Other impurities can be present without destroying the effectiveness of the molecular weight regulator, but they may cause undesirable effects, such as foaming. If desired, other types of molecular weight regulators such as beta-nitrostyrene and mercaptans can be used in conjunction with the primary molecular weight regulators.

The maleic monomers employed in the practice of the invention are selected from the group consisting of maleic anhydride, maleic acid and half esters of maleic acid and a 1–8 carbon atom monohydric alcohol. Typical examples of such monomers, in addition to maleic anhydride and maleic acid, include methyl acid maleate, secondary butyl acid maleate, butyl Cellosolve acid maleate, 2-ethylhexyl acid maleate, octadecyl acid maleate, etc. In one embodiment of the invention, the maleic monomer polymerized will consist of a mixture of methyl acid maleate and secondary butyl acid maleate in which the secondary butyl acid maleate constitutes in excess of 50 weight percent of the mixture.

The maleic monomer and the styrene monomer will be employed in the ratio of 1–2 and preferably 1–1.5 molar portions of the styrene monomer per molar portion of the maleic monomer. In an especially preferred embodiment of the invention the styrene monomer and the maleic monomer will be employed in an essentially equimolar ratio.

When employing the interpolymer of this invention with the thermosetting reaction product, it may be desirable to first prepare the salt of the interpolymer particularly when the interpolymer is employed with an aqueous thermosetting reaction product. Any salt of the interpolymer can be employed providing that the particular salt does not have a detrimental effect upon the cured resin composition. However, particularly useful are the ammonium and substituted ammonium salts of the interpolymer such as the mono-, di- and tri-ethanol amine salts of the interpolymer. Also useful are the alkali metal and earth alkali metal salts of the interpolymer. It is preferable in the preferred embodiment of this invention to use the ammonium salt of the interpolymer when employing an aqueous thermosetting reaction product.

As stated previously in the practice of this invention, the resin composition when advanced to an infusible state has excellent thermal stability and excellent thermal flexibility. When the resin composition is advanced to the infusible state under the influence of heat, the thermosetting reaction product and the interpolymer actually react together. It is believed that the interpolymer reacts with the methyl groups of the melamine resin to form the ester between the cross-linked melamine-formaldehyde resin. It is this reaction of the two materials that provides for the excellent thermal flexibility and excellent thermal stability of the resin product after it is advanced to the infusible state.

The molecular weight regulators employed in the process of the invention contain olefinic unsaturation and it is believed that, to a degree at least, the molecular weight modifier actually interpolymerizes with the maleic monomer and/or the styrene monomer. This belief is strengthened by the observation that the polymeric products obtained by the process of the invention are completely soluble in aqueous ammonia. If any substantial quantity of the molecular weight regulator were present in a freeform it would be insoluble in the aqueous ammonia. Thus, in all probability, the polymeric products obtained by the process of the invention are either terpolymers of the maleic monomer, the styrene monomer and the molecular weight regulator and/or a blend of (1) an interpolymer of the maleic monomer and the styrene monomer and (2) an interpolymer of the maleic monomer and the molecular weight regulator. It is also possible than an additional component of the polymeric product may be an adduct formed between the maleic monomer and the molecular weight regulator. Formulae I and II below illustrate the most probable structures of such adducts when the molecular weight regulator is terpinolene.

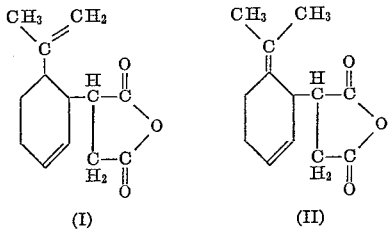

The resins of this invention are used in such applications as bonding of thermal insulation wherein thermal stability affords an excellent property, impregnation of paper for flexibility under elevated temperatures, coating of wire for use in high temperature applications and such other useful applications as requiring thermosetting resin compositions wherein thermal stability and thermal flexibility are desired.

It will thus be seen that the objects set forth above, among those made apparent from the preceding description, are efficiently attained and since certain changes may be made in carrying out the above process or method without departing from the scope of the invention, it is intended that all matter contained in the above description shall be interpreted as illustrative and not in a limiting sense.

What is claimed is:
1. A thermosetting resin composition comprising in admixture of
   (A) 75–25 weight percent of a thermosetting reaction product selected from the group consisting of melamine formaldehyde, derivatives of melamine-formaldehyde and mixtures thereof with phenol formaldehyde and
   (B) correspondingly, 25–75 weight percent of an interpolymer which is the polymerization reaction product of a styrene monomer, a maleic monomer, and a monomer of the formula:

wherein R is a cyclic organic radical to which =CR'R" is joined at a carbon atom of an alicyclic ring having at least 6 members, and wherein R' and R" are independently selected from the group consisting of hydrogen and an alkyl radical; wherein the maleic monomer is selected from the group consisting of maleic anhydride, maleic acid and half esters of maleic acid and 1–18 carbon atom monohydric alcohols, and mixtures thereof.

2. The composition of claim 1 wherein the thermosetting reaction product is a mixture of 80–20 weight percent of melamine-formaldehyde and, correspondingly, 20–80 weight percent of phenol formaldehyde.
3. The composition of claim 1 wherein the interpolymer is the water-soluble salt thereof.
4. A thermoset resin product having excellent thermostability and excellent thermoflexibility which is the reaction product of a thermosetting composition comprising in admixture of
   (A) 75–25 weight percent of a thermosetting reaction product selected from the group consisting of melamine-formaldehyde, derivatives of melamine-formaldehyde, and mixtures thereof with phenol formaldehyde and
   (B) correspondingly, 25–75 weight percent of an interpolymer which is the polymerization reaction product of a styrene monomer, a maleic monomer, and a monomer of the formula:

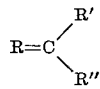

wherein R is a cyclic radical to which =CR'R" is joined at a carbon atom of an alicyclic ring having at least 6 members, and wherein R' and R" are independently selected from the group consisting of hydrogen and an alkyl radical; wherein the maleic monomer is selected from the group consisting of maleic anhydride, maleic acid and half esters of maleic acid and 1–18 carbon atom monohydric alcohols, and mixtures thereof.
5. The composition of claim 4 wherein the thermosetting reaction product is a mixture of 80–20 weight percent of melamine-formaldehyde and correspondingly 20–80 weight percent of phenol formaldehyde.
6. A fibrous material bonded with the thermoset resin composition of claim 4.
7. The fibrous material of claim 6 wherein the fibers are glass fibers.
8. The fibrous material of claim 6 wherein the fibers are cellulosic fibers.

References Cited
UNITED STATES PATENTS

| | | | |
|---|---|---|---|
| 2,708,645 | 5/1955 | Norman | 260—855 |
| 2,760,945 | 8/1956 | Bodenschatz et al. | 260—855 |
| 3,196,120 | 7/1965 | McLaughlin et al. | 260—855 |
| 3,223,751 | 12/1965 | Sellet | 260—855 |
| 2,469,408 | 5/1949 | Powers et al. | 260—848 |

OTHER REFERENCES

Boundy et al., Styrene Its Polymers, Copolymers and Derivatives, 1952, Reinhold, p. 844.

MURRAY TILLMAN, *Primary Examiner.*
JOHN C. BLEUTGE, *Assistant Examiner.*